United States Patent
Su et al.

(10) Patent No.: US 10,007,970 B2
(45) Date of Patent: Jun. 26, 2018

(54) IMAGE UP-SAMPLING WITH RELATIVE EDGE GROWTH RATE PRIORS

(71) Applicant: Samsung Electronics Co., Ltd., Suwon-si (KR)

(72) Inventors: Chang Su, Mountain View, CA (US); Li Tao, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 15/040,923

(22) Filed: Feb. 10, 2016

(65) Prior Publication Data

US 2016/0371818 A1 Dec. 22, 2016

Related U.S. Application Data

(60) Provisional application No. 62/162,588, filed on May 15, 2015.

(51) Int. Cl.
*G06T 5/30* (2006.01)
*G06T 5/00* (2006.01)
*G09G 5/391* (2006.01)

(52) U.S. Cl.
CPC .......... *G06T 5/003* (2013.01); *G06T 5/30* (2013.01); *G09G 5/391* (2013.01); *G06T 2207/20192* (2013.01); *G09G 2340/0407* (2013.01); *G09G 2340/16* (2013.01)

(58) Field of Classification Search
USPC ........................................................ 345/428
See application file for complete search history.

(56) References Cited

U.S. PATENT DOCUMENTS

| 7,218,796 B2 | 5/2007 | Bishop et al. |
| 8,339,512 B2 * | 12/2012 | Ota ................. G06T 5/50 348/441 |
| 8,811,774 B1 | 8/2014 | Chen et al. |

(Continued)

FOREIGN PATENT DOCUMENTS

WO  WO2012109528 A1  8/2012

OTHER PUBLICATIONS

Zhou et al. "Edge-Preserving Single image Super-Resolution", ACM 2011.*

(Continued)

*Primary Examiner* — Kimbinh T Nguyen

(57) ABSTRACT

A display system is configured to convert Full-High Definition (FHD) image content into Ultra-High Definition (UHD) image content. The display system includes an interface configured to receive image content comprising a first resolution, such as FHD. The display system also includes a display device configured to display image content at a second resolution, such as UHD, the second resolution greater than the first resolution. The display system further includes one or more processors configured to: convert the image content from the first resolution to the second resolution; recover a spatial frequency of the converted image content as a function of a relative edge growth rate measured from the converted image content and an offline-determined relationship between the relative edge growth rates of the converted first image and its corresponding ground truth image; and provide the converted image content with the recovered spatial frequency to the display device.

20 Claims, 9 Drawing Sheets

(56) References Cited

U.S. PATENT DOCUMENTS

| | | |
|---|---|---|
| 8,878,950 B2 | 11/2014 | Lelescu et al. |
| 8,929,662 B2 | 1/2015 | Park et al. |
| 8,958,484 B2 | 2/2015 | Sbaiz |
| 8,971,664 B2 | 3/2015 | VanDame |
| 8,989,519 B2 | 3/2015 | Irani et al. |
| 9,020,302 B2 | 4/2015 | Shmunk |
| 9,053,542 B2* | 6/2015 | Zillman ............ G06T 5/003 |
| 9,064,476 B2* | 6/2015 | Sun ................. G09G 5/391 |
| 9,299,128 B2* | 3/2016 | Tian ................ G06T 3/0093 |
| 9,626,749 B2* | 4/2017 | Golembiowski ...... G06T 5/20 |
| 9,692,939 B2* | 6/2017 | Irani ............... H04N 1/4092 |
| 2007/0257944 A1 | 11/2007 | Miller et al. |
| 2010/0027914 A1 | 2/2010 | Terada et al. |
| 2010/0054622 A1* | 3/2010 | Adams ............... G06T 3/403 382/269 |
| 2011/0019082 A1 | 1/2011 | Su et al. |
| 2012/0328210 A1* | 12/2012 | Fattal ............... G06T 3/403 382/264 |
| 2013/0121568 A1 | 5/2013 | Krishnan et al. |
| 2013/0177242 A1 | 7/2013 | Adams, Jr. et al. |
| 2013/0329098 A1 | 12/2013 | Lim et al. |
| 2014/0023271 A1 | 1/2014 | Baheti et al. |
| 2014/0105517 A1* | 4/2014 | Adams ............... G06T 3/403 382/264 |
| 2014/0177706 A1* | 6/2014 | Fernandes ........... H04N 19/463 375/240.03 |
| 2014/0324204 A1 | 10/2014 | Vidimce et al. |
| 2014/0355693 A1 | 12/2014 | Chen et al. |
| 2015/0071533 A1* | 3/2015 | Krishnan ............ G06T 3/4092 382/167 |
| 2015/0072728 A1 | 3/2015 | Rodriguez et al. |
| 2015/0093015 A1* | 4/2015 | Liang ............... G06K 9/6267 382/154 |
| 2015/0093045 A1 | 4/2015 | Turkan et al. |

OTHER PUBLICATIONS

Kim et al. "Regularization based Super-Resolution Image processing Algorithm Using Edge-Adaptive Non-local Means Filter", ACM 2013.*

Fattal "Image Up-sampling via Imposed Edge Statistics", ACM 2007.*

Sajadi et al. Edge-Guided Resolution Enhancement in Projectors vis Optical Pixel sharing, ACM 2012.*

* cited by examiner

IMAGE UP-SAMPLING WITH RELATIVE EDGE GROWTH RATE PRIORS

CROSS-REFERENCE TO RELATED APPLICATION(S) AND CLAIM OF PRIORITY

This application claims priority under 35 U.S.C. § 119(e) to U.S. Provisional Patent Application No. 62/162,588 filed on May 15, 2015 and entitled IMAGE UPSAMPLING WITH RELATIVE EDGE GROWTH RATE PRIORS. The above-identified provisional patent application is hereby incorporated by reference in its entirety.

TECHNICAL FIELD

This disclosure relates generally to image processing. More specifically, this disclosure relates to image up-sampling with relative edge growth rate priors.

BACKGROUND

Ultra-High Definition (UHD), also known as Super-Hi Vision in some countries, is a display format having a 16:9 ratio with at least one digital input cable carrying a minimum resolution of 3,840×2,160 pixels. Recently, UHDTVs have become commerically available in market. UHD content is not has prevalent and has become a bottle-neck problem inhibiting a popularity of UHDTVs. The fast growing UHD products, such as UHDTVs, lack UHD content due to the high-cost of UHD imaging systems and requirements for a huge restoration medium. Alternatively, massive Full-high Definition (FHD) content has existed in broadcasting industries for a long time. The FHD content, however, cannot be effectively used by the UHD products. When displayed by UHD devices, the FHD content must be up-sampled to a UHD format. A visual quality of the up-sampled images from FHD images are generally degraded by blur and image-detail loses.

SUMMARY

This disclosure provides an image resolution conversion, by up-sampling, with relative edge growth rate priors.

In a first embodiment, an apparatus is provided. The apparatus includes an interface configured to receive image content comprising a first resolution. The apparatus also includes a display device configured to display image content at a second resolution, the second resolution greater than the first resolution. The apparatus further includes one or more processors configured to: convert the image content from the first resolution to the second resolution; recover a spatial frequency of the converted image content as a function of a relative edge growth rate measured from the converted image content and an offline-determined relationship between the relative edge growth rates of the converted first image and its corresponding ground truth; and provide the converted image content with the recovered spatial frequency to the display device.

In a second embodiment, a method for converting image content is provided. The method includes converting a first image from the first resolution to the second resolution that is greater than the first resolution; recovering spatial frequency of the converted first image as a function of a relative edge growth rate measured from the converted first image and an offline-determined relationship between the relative edge growth rates of the converted first image and its corresponding ground truth; and providing the converted first image with the recovered spatial frequency for display on a display device.

In a third embodiment, a non-transitory computer readable medium embodying a computer program is provided. The computer program includes computer readable program code that, when executed by a processor, causes the processor to convert a first image from a first resolution to a second resolution, the second resolution is greater than the first resolution. The computer program also includes computer readable program code that, when executed by a processor, causes the processor to recover a spatial frequency of the converted first image as a function of a relative edge growth rate measured from the converted first image and an offline-determined relationship between the relative edge growth rates of the converted first image its corresponding ground truth, wherein the determined relationship represents the changes of spatial frequency caused by resolution conversion. The computer program further includes computer readable program code that, when executed by a processor, causes the processor to provide the converted first image with the recovered spatial frequency for display on a display device.

Other technical features may be readily apparent to one skilled in the art from the following figures, descriptions, and claims. Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital versatile disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
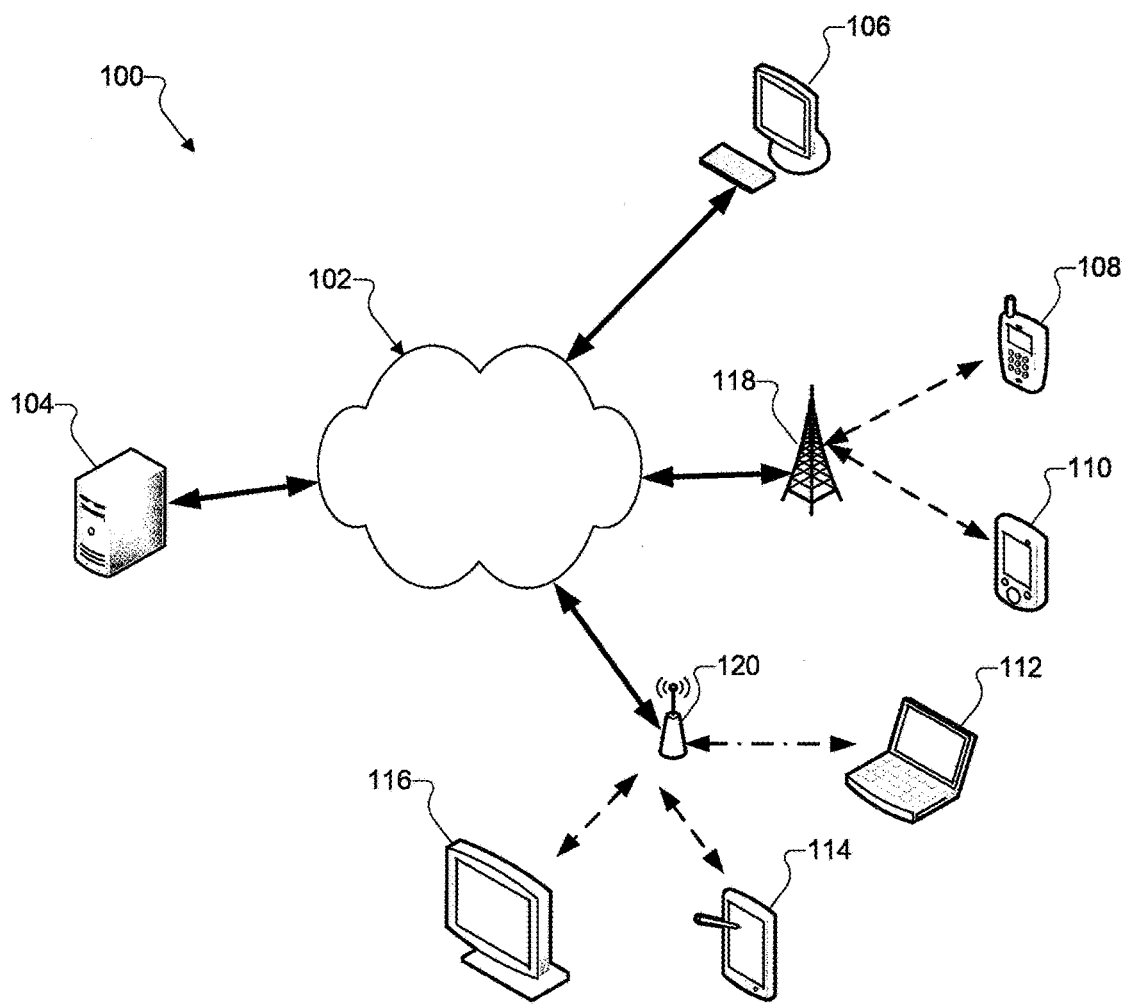
FIG. 1 illustrates an example computing system according to an embodiment of this disclosure.

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system. Example embodiments are described in the context of up-conversion for Ultra-High Definition Televisions (UHDTVs) of Full-high Definition (FHD) resolution to Ultra-High Definition (UHD) resolution. It will be understood, however, that alternative embodiments include up-conversion for any suitable display device and up-conversion from any first resolution to any suitable second resolution.

As UHDTVs have become more prevalent, FHD content has been provided for display on the UHDTVs. The fast-developing UHD broadcasting market needs an effective and economic image resolution conversion, namely up-sampling, technique for high-quality FHD to UHD conversion. When FHD images are displayed on UHDTVs, they may look softer than they appear as real UHD images and will look bit blurry due to the loss of fine image details, such as high-frequency components (HFC). That is, when FHD images are displayed on UHDTVs, the FHD images do not look as sharp as the FHD images appear as real UHD images. In addition, FHD images shown on UHDTVs look a little bit blurry due to the loss of fine image details. Recovering high-frequency components (HFC) that are lost during FHD-UHD up-sampling is the most important key to solve the problems that degrade sharpness and cause blurriness. However, recovering the HFC is very challenging in practice due to the constraints of costs and hardware implementations. For example, interpolation and super-resolution (SR), which may either be multi-frame reconstruction based (RB) or example-based (EB), are the most commonly used methods to implement FHD-UHD conversion. The efficient and economic interpolation methods cannot recover the HFC; thus the interpolation results are very blurry. The RB-SR methods recover the HFC by registration, interpolation, and back-projection iteration. The RB-SR methods perform better than interpolation, but suffer from the errors in sub-pixel level registration, and the methods generally require a high-cost in hardware. A number of EB-SR algorithms provide good results. However, the EB-SR algorithms are computationally expensive and time-consuming. Also, due to their iteration-based frameworks, the EB-SR algorithms are very difficult to be implemented by hardware.

Interpolation based up-sampling methods in commercial applications cannot fix the problem since they are not capable of recovering any HFC. The high-performance RB or EB SR methods may be too expensive and complex to be implemented by hardware and thus may not be appropriate for commercial application.

Embodiments of the present disclosure provide a single-image resolution conversion, or up-sampling, (SIU) process that can provide effective up-sampling that is suitable for implementation. First, the SIU process is configured to effectively recover HFC to retrieve sharp and clear UHD images. Second, the SIU process is efficient enough to be adopted in real-time applications, in which iteration is not acceptable. Third, the SIU process is economic and hardware friendly. Therefore, a cost of implementing the SIU and its related products can be low.

Certain embodiments of the present disclosure provide a fast single-image up-sampling process to solve the problem for FHD-UHD conversion. Noting that interpolation decreases the spatial frequency (SF), which measures how fast image intensities change, certain embodiments of the present disclosure recover the HFC that are lost during up-sampling by recovering the SF of an original FHD image in its UHD counterpart. Certain embodiments of use REGR to represent the SF of an image. First, the priors of the REGR (REGR priors) of different edges are learned from many real-world image contents, and statistically modeled. This may occur offline and the REGR priors are provided to a UHD display device. Second, in response to receiving a given FHD image, the UHD display device can compute an initial guess of its UHD image by an interpolation algorithm. Edges in the initial guess, including both strong and weak edges, are represented by a flexible growth function but with different REGRs. By using the REGR priors learned in the first step, the REGRs are adopted to be the closed estimation of the REGRs of the original edges. Thus, the lost SF can be effectively recovered. The initial guess can be reconstructed from the adopted REGRs and obtain a visually pleased UHD image with sharp and clear edges and details.

Certain embodiments provide a method that can recover the lost spatial frequency (SF) in an initially up-sampled image according to the REGR priors of real-world image edges and thus effectively improve the sharpness and clearness of edges and details. At the same time, certain embodiments protect natural blur, which may either be the natural intensity transitions or be caused by camera-out-of-focus. Certain embodiments provide a feature-based representation of image edges; an effective statistic model built for edge prior learning; two important real-world edge priors with which the SF that were not recovered during up-sampling can be effectively recovered; a content-robust gradient-adaptive image edge growth rate recovering method using real-world edge priors; and a fast and hardware friendly image reconstruction strategy, which effectively removes the blur caused by up-sampling thus improves the sharpness and clearness of the obtained images, and at the same time protects natural blur thus maintains the naturalness of the real-world contents.

Certain embodiments also provide a method that can effectively remove the blur caused by up-sampling thus improve the sharpness of edges and delicate structures (including both strong and weak ones). At the same time, the natural blur is effectively protected. The obtained images looked very natural. In certain embodiments, by controlling edge growth rate without changing any other features, overshoot or undershoot can be totally avoided in the up-sampled image. Unlike intensity-based edge thinning, which often leads to cut-effect and introduces unnaturalness into the final results, certain embodiments can facilitate recovering lost spatial frequency in feature domain. Many delicate details in the intensity transition of an edge can be preserved.

FIG. 1 illustrates an example computing system 100 according to this disclosure. The embodiment of the computing system 100 shown in FIG. 1 is for illustration only. Other embodiments of the computing system 100 can be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-116. Each server 104 includes any suitable computing or processing device that can provide computing services for one or more client devices. Each server 104 can, for example, include one or more processing devices, one or more memories storing instructions and data, and one or more network interfaces facilitating communication over the network 102.

Each client device 106-116 represents any suitable computing or processing device that interacts with at least one server or other computing device(s) over the network 102. In this example, the client devices 106-116 include a desktop computer 106, a mobile telephone or smartphone 108, a personal digital assistant (PDA) 110, a laptop computer 112, a tablet computer 114, and a UHDTV 116. However, any other or additional client devices can be used in the computing system 100.

In this example, some client devices 106-116 communicate indirectly with the network 102. For example, the client devices 108-110 communicate via one or more base stations 118, such as cellular base stations or eNodeBs. Also, the client devices 112-116 communicate via one or more wireless access points 120, such as IEEE 802.11 wireless access points. Note that these are for illustration only and that each client device can communicate directly with the network 102 or indirectly with the network 102 via any suitable intermediate device(s) or network(s). In certain embodiments, one or more client devices 106-116 can communicate with network 102 or server 104 via one or more satellite systems.

As described in more detail below, one or more of client devices 106-116 include a UHD display configured to display having a 16:9 ratio with at least one digital input cable carrying a minimum resolution of 3,840×2,160 pixels. The client devices 106-116 including the UHD display are configured to receive FHD content from server 104 or another FHD content medium, such as content recorded on a disc or digital versatile disc (DVD), and display the FHD content as UHD content by fast single-image up-sampling with relative edge growth rate priors.

Although FIG. 1 illustrates one example of a computing system 100, various changes may be made to FIG. 1. For example, the system 100 can include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features can be used in any other suitable system.

Figure 2:
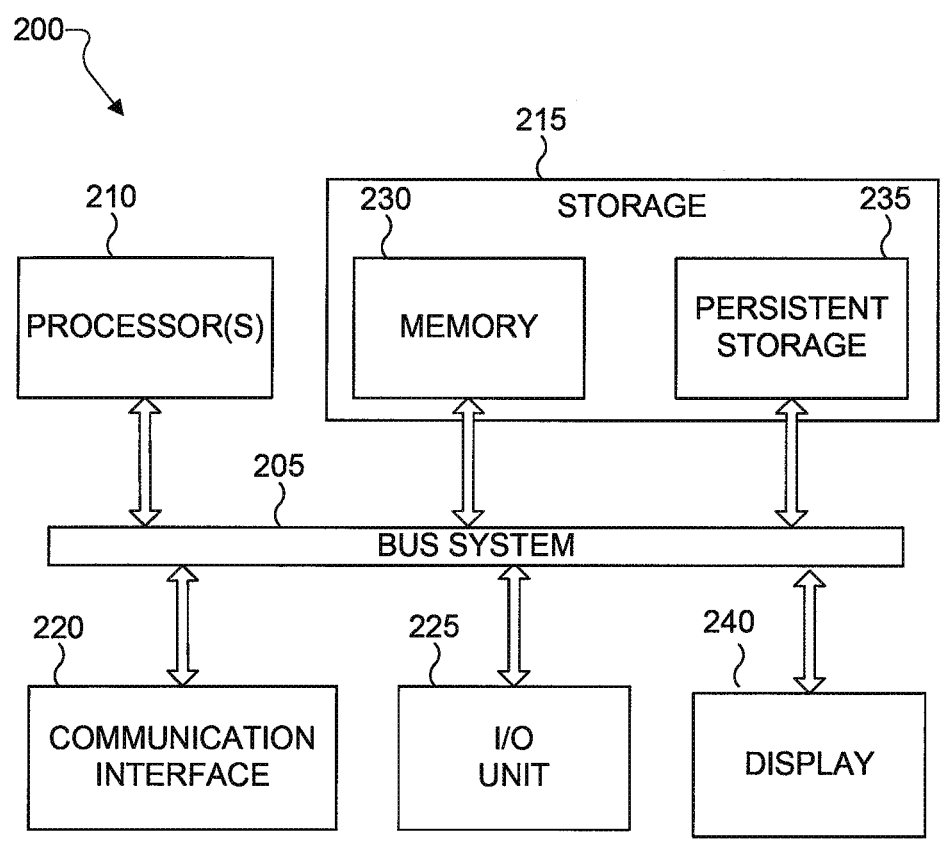
FIG. 2 illustrate a device having an Ultra-High Definition Display in a computing system according to an embodiment of this disclosure.
Figure 3A:
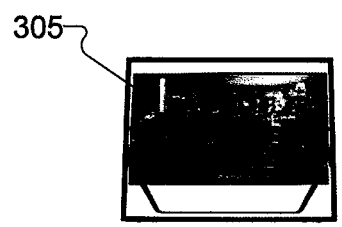
FIGS. 3A, 3B and 3C illustrate example Ultra-High Definition Displays according to embodiments of this disclosure.
Figure 3B:
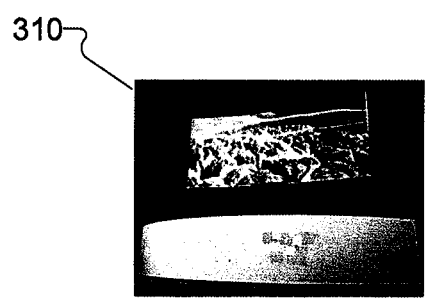
Figure 3C:
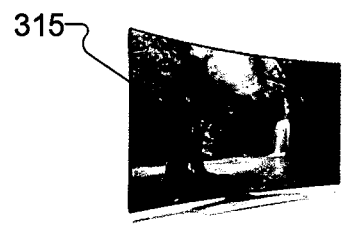

FIG. 2 illustrate a device having an Ultra-High Definition Display in a computing system according to this disclosure. FIGS. 3A, 3B and 3C illustrate example UHD Displays according to this disclosure. The UHD device 200 can represent one or more of the client devices 106-116 in FIG. 1.

As shown in FIG. 2, the UHD device 200 includes a bus system 205, which supports communication between one or more processors 210, at least one storage device 215, at least one communications interface 220, and at least one input/output (I/O) unit 225. The storage device 215 can include a memory 230, a persistent storage 235, or both. The UHD device 200 also includes a UHD display 240.

The one or more processors 210 execute instructions that may be loaded into a memory 230. The one or more processors 210 include any suitable number(s) and type(s) of processors or other devices in any suitable arrangement. Example types of processors 210, or processing devices, include microprocessors, microcontrollers, digital signal processors, field programmable gate arrays, application specific integrated circuits, and discrete circuitry.

The memory 230 and persistent storage 235 are examples of storage devices 215, which represent any structure(s) capable of storing and facilitating retrieval of information (such as data, program code, and/or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc. The storage devices 215 can include instructions to be executed by a processor to perform fast single-image up-sampling with relative edge growth rate priors to convert FHD content to UHD content for display on the UHD display 240.

The communications interface 220 supports communications with other systems or devices. For example, the communications interface 220 can include a network interface card or a wireless transceiver facilitating communications over the network 102. The communications interface 220 can support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The UHD display 240 includes a 16:9 ratio with at least one digital input cable carrying a minimum resolution of 3,840×2,160 pixels. Examples of the UHD display 240 can include a UHDTV such as a first UHDTV 305 shown in FIG. 3A, a second UHDTV 310 having a curved surface as shown in FIG. 3B, or a smaller display such as a third UHD display 315 shown in FIG. 3C. The UHD display 240 is configured to receive FHD content from server 104, from an external input via the I/O unit 225 or communication interface 220, or from another FHD content medium, such as content recorded on a disc or DVD, and display the FHD content as UHD content by fast single-image up-sampling with relative edge growth rate priors. In certain embodiments, the one or more processors 210 are configured to perform fast single-image up-sampling with relative edge growth rate priors to convert FHD content to UHD content for display on the UHD display 240. In certain embodiments, the UHD display 240 includes a processor or processing device configured to perform fast single-image up-sampling with relative edge growth rate priors to convert FHD content to UHD content for display on the UHD display 240.

Note that while FIGS. 3A-3C are described as representing UHDTVs 305, 310 and 315, the same or similar structure can be used in one or more of the client devices 106-116. For example, a laptop or desktop computer can have the same or similar structure as that shown in FIGS. 2 and 3A-3C.

In certain embodiments, the SIU process includes three parts, namely 1) edge representation, 2) edge-priors learning, and 3) image reconstruction with learned priors. Certain embodiments utilize REGR, to describe a real-world image edge. With the feature-based edge representation, an edge is transferred from intensity domain to the feature domain. Then, with a number of real-world ground truth images, the priors of edges belonging to the ground truth, namely, the edges that are not contaminated by the blur caused by up-sampling, are learned. With the learned priors, for any edges in an initial guess of an UHD image (usually obtained by interpolation from a given FHD image), the SIU process estimates/recovers the growth rate that the edge should have in the original but unknown UHD image. Finally, with the estimated edge growth rate, the initial guess can be reconstructed and thus a visual pleasing sharp, clear UHD image can be obtained.

Figure 4:
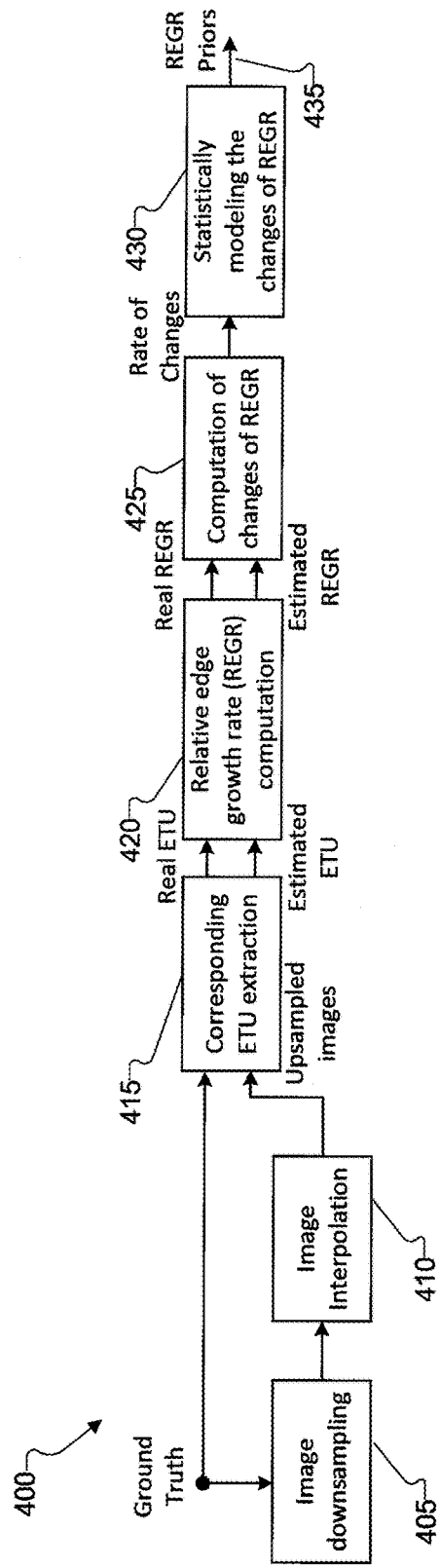
FIG. 4 illustrates a system for computing REGR priors according to an embodiment of the present disclosure.

FIG. 4 illustrates a system for computing REGR priors according to an embodiment of the present disclosure. The system 400 can compute REGR priors in an offline manner based on a number of reference images. The embodiment of the system 400 shown in FIG. 4 is for illustration only. Other embodiments could be used without departing from the scope of the present disclosure.

In certain embodiments, the system 400 is deployed on the server 104 of FIG. 1 or any suitable computer system. For example, the server 104 can include one or more processors that execute instructions to perform an SIU process such as to compute REGR priors in an offline manner based on a number of reference images. The one or more processors include any suitable number(s) and type(s) of processors or other devices in any suitable arrangement. Example types of processors, or processing devices, include microprocessors, microcontrollers, digital signal processors, field programmable gate arrays, application specific integrated circuits, and discrete circuitry. The generated REGR priors can be provided dynamically over the network 102, distributed with the associated video content data, or can be stored in the memory, such as storage 215 of FIG. 2), of client devices 106 through 116.

Image edges contain HFC that determine the sharpness and clearness of image details. While representations of an edge that are intensity-based can provide a direct representation, intensity-based representation may not be convenient to edge-adaptation processing due to their sensitivity to different image contents and luminance conditions. Certain embodiments use REGR, as a content-robust representation of image edges, as will be describe in greater detail below.

Let the continuous pixels, such as pixels along a given horizontal or vertical direction in a neighborhood of an edge pixel, which 1) have the same gradient monotonic, and 2) pass a local-significant edge point p along a given direction, be an edge transition unit (ETU), denoted $\mathcal{U}_p(x)$, where x is the coordinate of p. The SIU process recovers the spatial frequency (SF) of $\mathcal{U}_p(x)$ in an initially guessed UHD image. Note that the higher the SF is in $\mathcal{U}_p(x)$, the faster the intensities change in $\mathcal{U}_p(X)$. $\mathcal{U}_p(X)$ is first modeled by introducing the edge slope into a flexible growth function, as shown in Equation (1):

$$\mathcal{U}_p(x) = L + \frac{K-L}{(1 + Qe^{-\beta sx})^2}, \qquad (1)$$

where L and K are the lower and the upper asymptotes, respectively; Q is a value related to zero-cross point; s indicates the edge slope monotonic, and s is either +1 (increasing) or −1 (decreasing); and β is the growth rate of the curve, and used as the REGR of ETU $\mathcal{U}_p(x)$. To a given $\mathcal{U}_p(x)$, K, L, Q, and s are all known, thus its SF is then determined by β. As shown in Equation (1), the higher the β, the faster the intensities in $\mathcal{U}_p(x)$ change, and the higher is the SF of $\mathcal{U}_p(x)$.

Equation (1) models an ETU with a single β, which is convenient to learn the REGR priors from real-world edges. However, this may also erase delicate image details when reconstructing the ETU from β. An ETU is represented with multiple REGRs, namely, $\{\beta_x\}$. Let $x_k$ be a concrete value of x, where k is the index of a point in the ETU, from (1), the ETU is represented as shown in Equation 2:

$$\mathcal{U}_p(x_k) = L + \frac{K-L}{(1+Qe^{-\beta(x_k)sx_k})^2}. \qquad (2)$$

To learn the priors of the REGR of real-world edges, many real-world UHD images are can be selected, such as randomly, as reference images, which are referred herein as "ground truth images" or "ground truth," and denoted {X}. The ground truth is received by an imaging down-sampling block 405, which down-samples the image. The imaging down-sampling block 405 and the image interpolation block 410 obtain an estimation of {X}, denoted {χ}, by down-sampling {X} followed by interpolating the down-sampled images with the same factor. In FHD-UHD conversion applications, the factor is set as 2. In alternative uses, the factor can be determined based on the content resolution and the display resolution.

The up-sampled images from the image interpolation block 410 are sent to an edge transition unit (ETU) extraction block 415. The ETU extraction block 415 extracts an estimated ETU from the up-sampled images and its corresponding real ETU from the ground truth images. In ETU extraction block 415, edge detection is applied to both {X} and {χ} to determine the potential ETUs. A relatively low threshold is used in edge detection to detect both strong and weak edges. With ETU matching detection within a small range, the corresponding ETU pairs in {X} and {χ}, namely, the real ETU and the estimated ETU, are obtained.

In an example application, over 100,000 ETU pairs are detected. With Equation (1) and least-square approaching, each ETU is represented as β. An REGR computation block 420 receives the estimated ETU and real ETU and computes an estimated REGR and a real REGR. Let $\beta_X$ and $\beta_\chi$ be the REGRs of an ETU in ground-truth X and an ETU in its estimation χ. The changes of REGR are computed in computation block 425. The changes of SF due to down-sampling and up-sampling is then defined as REGR ratio $\gamma_\beta$, such as according to Equation (3):

$$\gamma_\beta = \beta_X / \beta_\chi \qquad (3).$$

Thereafter, modeling block 430 statistically models the changes of REGR to calculate REGR priors 435. To obtain the priors of $\gamma_\beta$, SF loss is estimated after up-sampling. Considering the dependency between SF and image gradients, ($R_\beta$, G) are defined as a pair of random variables of REGR ratios and image gradients. From the obtained ETU pairs, the join distribution of ($R_\beta$, G) 500 is obtained as shown in FIG. 5.

Figure 5:
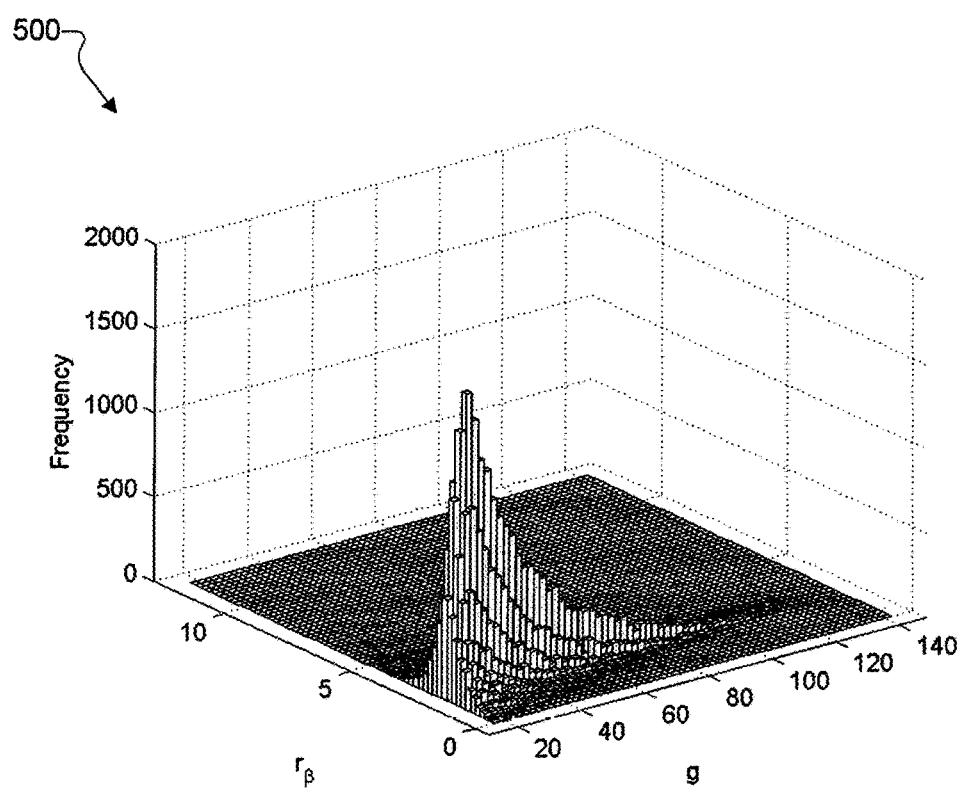
FIG. 5 illustrates a joint distribution of $(R_\beta, G)$ according to an embodiment of the present disclosure.

FIG. 5 illustrates a joint distribution of ($R_\beta$, G) according to an embodiment of the present disclosure. The embodiment of the joint distribution of ($R_\beta$, G) 500 shown in FIG. 5 is for illustration only. Other embodiments can be used without departing from the scope of the present disclosure.

Figure 6A:
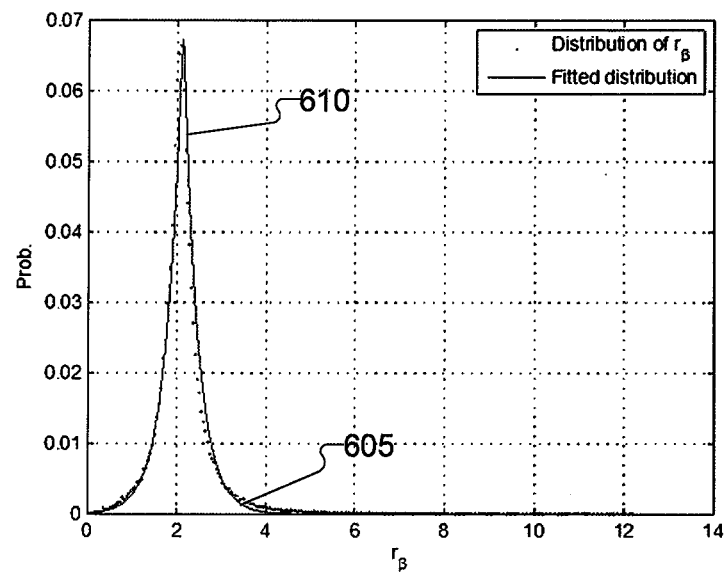
FIG. 6A illustrates a marginal distribution of $\gamma_\beta$ according to an embodiment of the present disclosure.

From the joint distribution of ($R_\beta$, G) 500, the marginal distribution 605 of ($R_\beta$, G) can be obtained, as shown in FIG. 6A. The marginal distribution of $R_\beta$ can be approximated by a fitted distribution 610, modeled as a Laplace-distribution with parameters μ=2.1374 and b=0.3399, as shown in Equation (4):

$$p(\gamma_\beta) = \frac{1}{2b} e^{-\frac{|\gamma_\beta - \mu|}{b}}. \qquad (4)$$

Equation (4) provides the first prior of $\gamma_\beta$. That is, $\gamma_\beta$ has over 0.95 probability that falls into [1.0, 3.07]. In certain embodiments, the marginal distribution can be modeled be any suitable relations, or parameters μ and b can be chosen as any suitable values based on the marginal distribution of $R_\beta$ data.

Figure 6B:
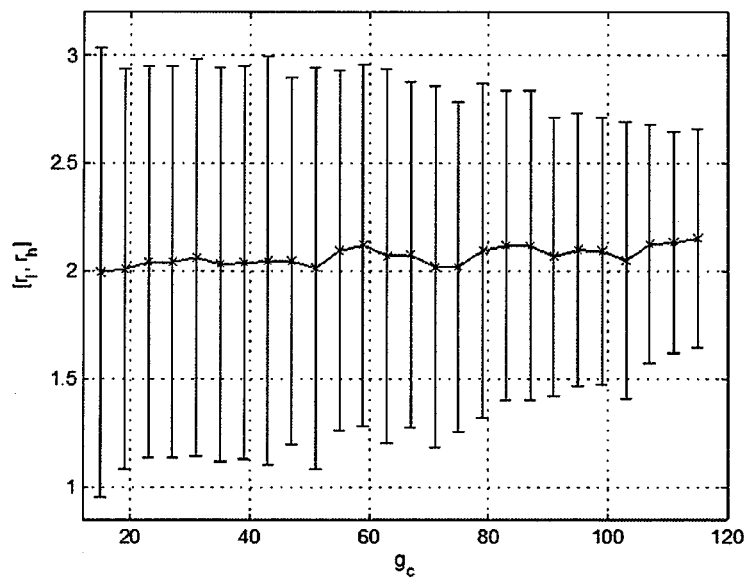
FIG. 6B illustrates a relationship between changes of $\gamma_\beta$ and corresponding gradients according to an embodiment of the present disclosure.

The second prior of $\gamma_\beta$ obtained from FIG. 5 is that, by finding [$\gamma_l$, $\gamma_h$], $\gamma_l < \gamma_h$. This satisfies the conditional probability shown in Equation (5):

$$P[\gamma_l \leq R_\beta \leq \gamma_h | G \in \mathcal{R}(g_c)] \geq \alpha, \qquad (5),$$

where $\mathcal{R}(g_c)$ is a neighborhood centered by a given gradient $g_c$, and α is an user-desired probability. With Equation (5), the range into which $\gamma_\beta$ falls can be estimated with the probability that is higher than the user-desired probability α. Therefore, $\gamma_\beta$ varies in a small range but related to g as g changes in a big range. As shown in FIG. 6B, in many cases, $\gamma_\beta$ has over 0.9 probability that falls into interval [1.0, 3.0], except the case of very low gradients.

Two important priors of $\gamma_\beta$ are obtained from FIGS. 5, 6A and 6B, as well as Equations (4) and (5). With the REGR priors, the SF loss during up-sampling can effectively and efficiently be estimated.

Figure 7:
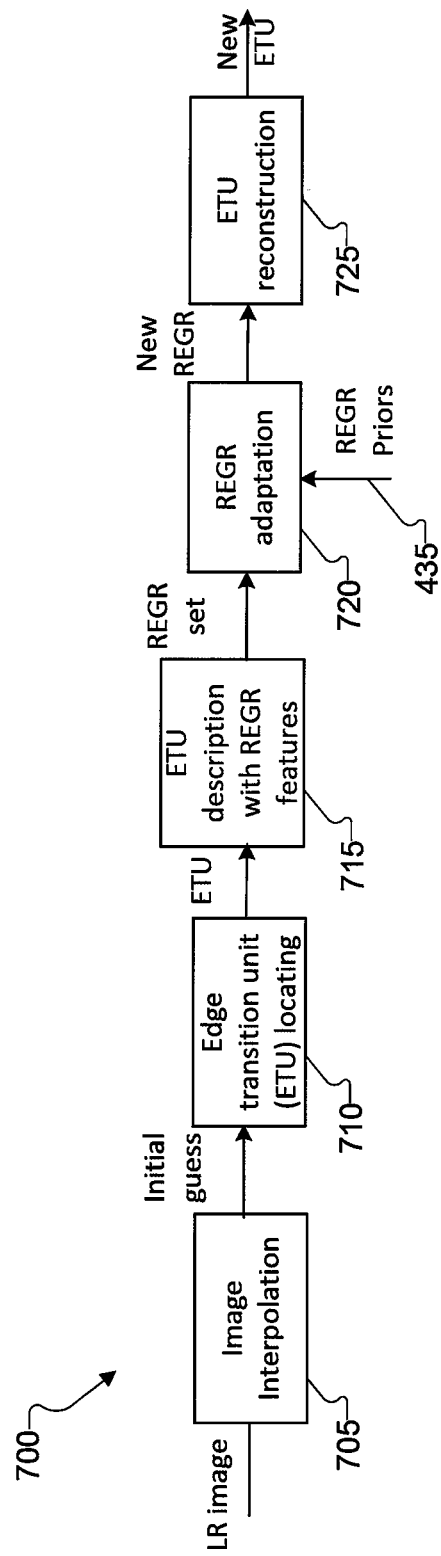
FIG. 7 illustrates a system for content-adaptive REGR adaptation and image reconstruction process according to an embodiment of the present disclosure.

FIG. 7 illustrates a system for content-adaptive REGR adaptation and image reconstruction processing according to an embodiment of the present disclosure. The embodiment of the system 700 shown in FIG. 7 is for illustration only. Other embodiments can be used without departing from the scope of the present disclosure.

The system 700 can be deployed on any of the user devices 106 through 116 of FIG. 1 or any device capable of processing video or image content for display. In an embodiment, the components of the system 700 can deployed by the processor(s) 210 and program instructions stored in the storage 215 of FIG. 2. The system 700 can have access to REGR priors, such as the REGR priors generated by the system 400 of FIG. 4.

In the example shown in FIG. 7, an image interpolation unit 705 up-samples a received low resolution (LR) image. With Equation (2), an ETU is represented as a set of REGRs, namely $\beta(x_k)$. To a given ETU, its parameters L, K, Q, and s are all known. Among the parameters, L, K, and s can be directly obtained from the ETU itself, and Q can be obtained from Equation (2), as shown in Equation 6:

$$Q = \sqrt{\frac{K-L}{\mathcal{U}(x_0)-L}} - 1, \qquad (6)$$

where $x_0$ is the local origin. Note that $x_0$ is not necessarily be the position of the local-significant point p, which defines the ETU, and $\mathcal{U}(x_0)$ is therefore not necessarily be the intensity of p. An ETU locating block 710 performs ETU locating. The center of mass of an ETU is used as $x_0$. Thus, $\beta(x_k)$ can be computed from the given ETU $\mathcal{U}_p(x_k)$ as shown in Equation (7):

$$\beta(x_k) = -\frac{1}{sx_k} \ln \frac{1}{Q} \left( \sqrt{\frac{K-L}{\mathcal{U}_p(x_k)-L}} - 1 \right). \qquad (7)$$

According to the REGR priors 435 previously obtained, $\gamma_\beta$ has 0.95 probability to fall into [1.0, 3.07], and in most cases, $\gamma_\beta$ has a 0.9 probability between 1.0 and 3.0. In addition, $\gamma_\beta$ increases slightly as gradient g increases. ETU block 715 calculates an ETU description with REGR features. In block 715, $\gamma_\beta$ is applied to $\beta(x_k)$; thus an estimate of the REGRs of the ETU in the ground truth is calculated, namely, the REGRs before being degraded by image down-sampling and up-sampling. Taking the dependency between $\gamma_\beta$ and gradient g, the SIU process uses a conception of just-visually-noticeable edge gradient, denote $g_{jvn}$, which is a gradient that makes an edge that can be just noticed by human visual system. The significance of an edge is then computed according to Equation (8):

$$s_e(x_k) = \frac{G_p(x_k)}{g_{jvn}}, \quad (8)$$

and the higher the $s_e(x_k)$ is, the more significant the edge is, thus the higher the $\gamma_\beta$ should be.

REGR adaptation is performed in block 720. A new REGR is calculated as a function of the REGR priors 435. From the previously obtained REGRs priors 435, $\gamma_\beta$ can be estimated according to Equation 9:

$$\gamma_\beta(x_k) = \begin{cases} 1.0 : s_e(x_k) < 1.0 \\ s_e(x_k) : 1.0 \leq s_e(x_k) \leq 3.0 \\ 3.0 : \text{otherwise} \end{cases} \quad (9)$$

Thus, the REGRs of the given ETU can be reconstructed as $\hat{\beta}(x_k)$, namely, according to Equation 10:

$$\hat{\beta}(x_k) = \gamma_\beta(x_k) \times \beta(x_k). \quad (10)$$

In block 725, the ETU $\mathcal{U}_p(x_k)$ can be reconstructed as $\hat{\mathcal{U}}_p(x_k)$ with (2). As shown in Equations (2), (9) and (10), the only item that is change is $\beta(x_k)$, the other parameters, namely K, L, Q, and s all remain unchanged. In such a way, overshoot can be avoided in the up-sampled images.

FIGS. 8A, 8B, 8C and 8D illustrate a comparison of a test image with an image from an SIU system according to an embodiment of the present disclosure. The comparisons shown in FIGS. 8A through 8D are for illustration only and other examples can be used without departing from the scope of this disclosure.

Figures 8A, 8B, 8C, 8D:
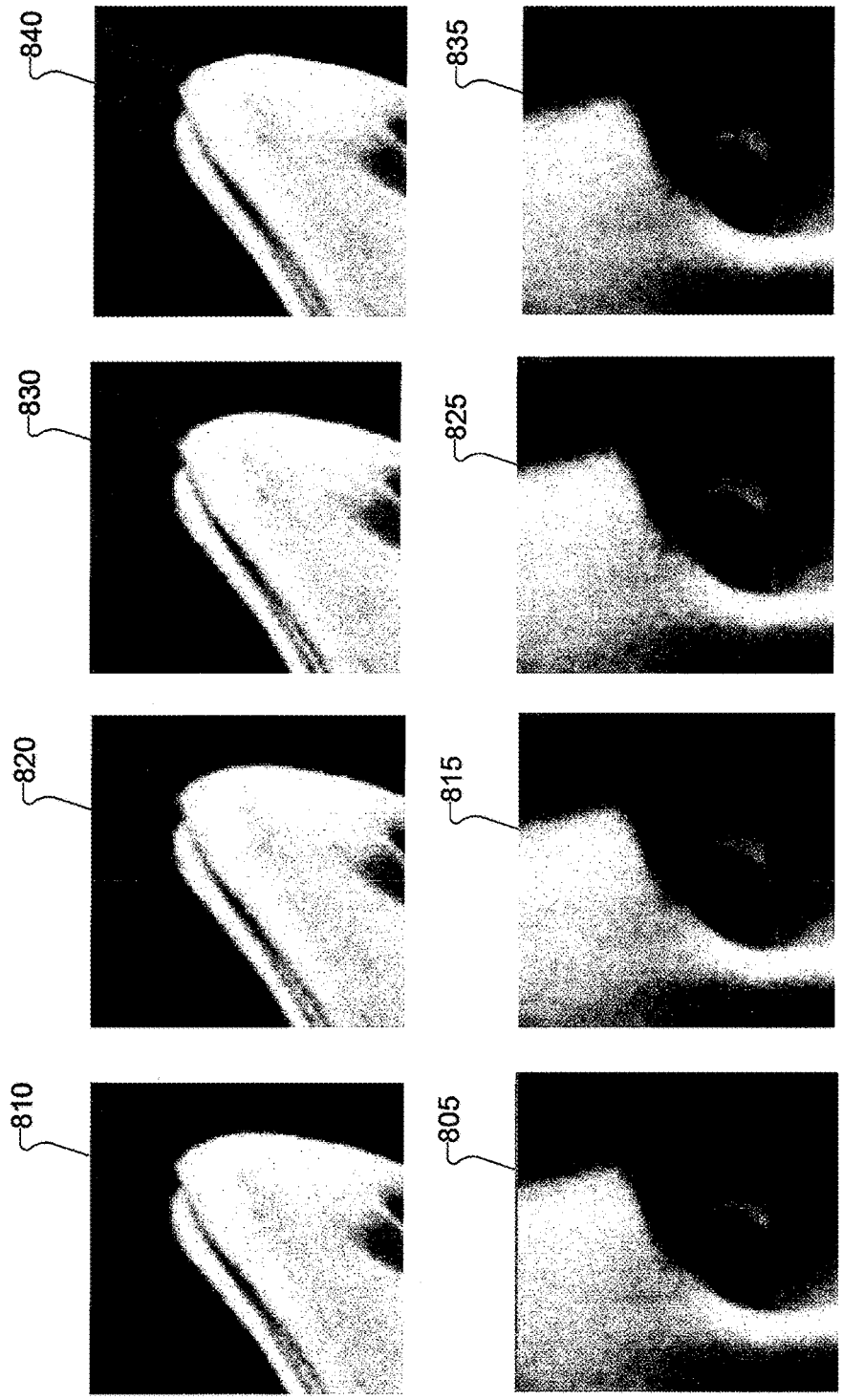
FIGS. 8A, 8B, 8C and 8D illustrate a comparison of various converted images with a converted image from an SIU system according to an embodiment of the present disclosure.

Referring to FIGS. 8A through 8D, a test image "Leena" converted using an SIU system or SIU process are illustrated with three fast and industry-feasible image up-sampling algorithms, including the widely used Bicubic interpolation, the edge-directed triangle interpolation (EDTI), and the fractal super-resolution (F-SR). For each figure, two crops of the test image Lenna image are shown: (1) a crop of an eye (the crop referred to herein as "eye"); and (2) a crop of the brim of the hat (the crop referred to herein as "hat"). FIG. 8A illustrates a first image of "eye" 805 and "hat" 810 obtained by FHD to UHD conversion using Bicubic. FIG. 8B illustrates a second image of "eye" 815 and "hat" 820 obtained by FHD to UHD conversion using EDTI. FIG. 8C illustrates a third image of "eye" 825 and "hat" 830 obtained by FHD to UHD conversion using F-SR. FIG. 8D illustrates a fourth image of "eye" 835 and "hat" 840 obtained by FHD to UHD conversion using the SIU process disclosed herein. Although three up-sampling algorithms are used for comparison, any number of algorithms can be used and any known algorithm can also be utilized for comparison.

As shown in the examples of FIGS. 8A through 8D, the SIU system generates the sharpest edges without damaging the naturalness of the edges and protects natural blur. Also, after carefully checking the obtained strong edges, it can be confirmed that overshoot, which occurs in many quality enhancement processing, is successfully avoided. The Bicubic and EDTI algorithms generate very blurry results as shown in FIGS. 8A and 8B respectively. The F-SR outperforms the Bicubic and the EDTI, however, as shown in FIG. 8C, the F-SR results are still blurry, and slightly boosts the existing artifacts. The SIU process provides audiences with the best visual pleased results.

Figure 9:
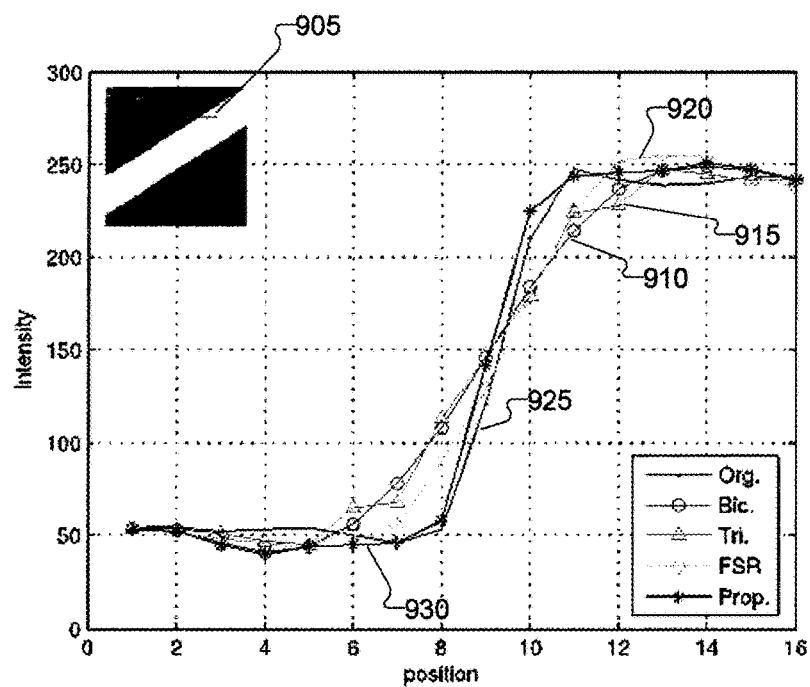
FIG. 9 illustrates edge profiles of the same randomly select edge with different up-sampling methods according to an embodiment of the present disclosure.

In addition to the test image "Lenna", many test images were used to evaluate the performance of the SIU up-sampling process. For example, to more clearly demonstrate the spatial frequency recovering ability of the SIU process, FIG. 9 illustrates edge profiles of the same randomly selected edge but with different up-sampling methods. In FIG. 9, the image patch shown in the top-left corner shows the randomly selected edge, which is marked by a line 905. As can be seen in FIG. 9, the Bicubic 910 and the EDTI 915, which is marked as Tri, performs similarly to each other, but the EDTI 915 slightly better than the Bicubic 910. The F-SR 920 clearly performs better than the Bicubic 910 and the EDTI 915, but comparing to the original edge 925 (the ground truth), it is still blurry. The SIU process 930 successfully recovers the spatial frequency that is lost during up-sampling, and obtains the most similar edge to the ground truth in these experiments. As shown in the example shown in FIG. 9, the edge growth rate obtained by the SIU process is very similar to the ground truth. Only small intensity offset that is caused by the low-passing during image down-sampling, which is how an FHD image is obtained from a UHD image, exist between the two edges.

In addition to high performance, the SIU process is also very efficient. Table 1 shows the time consumed for the simulations used in FIG. 9. As can be seen, the SIU process is about 10.7% faster than the state-of-the-art F-SR algorithm. Although the SIU process may be slower than the Bicubic and the EDTI, Bicubic and EDTI did not achieve the level of performance of the SIU process.

TABLE 1

Time consuming of some simulations with different test images (in seconds).

| Image | Bicubic | EDTI | F-SR | Ours |
|---|---|---|---|---|
| Lenna (SD) | 0.132 | 0.193 | 0.430 | 0.394 |
| Bird Net (FHD) | 0.968 | 1.356 | 3.581 | 3.023 |
| Dulls (FHD) | 0.969 | 1.398 | 3.480 | 3.264 |
| Temple (FHD) | 0.955 | 1.417 | 3.553 | 3.192 |

Figure 10:
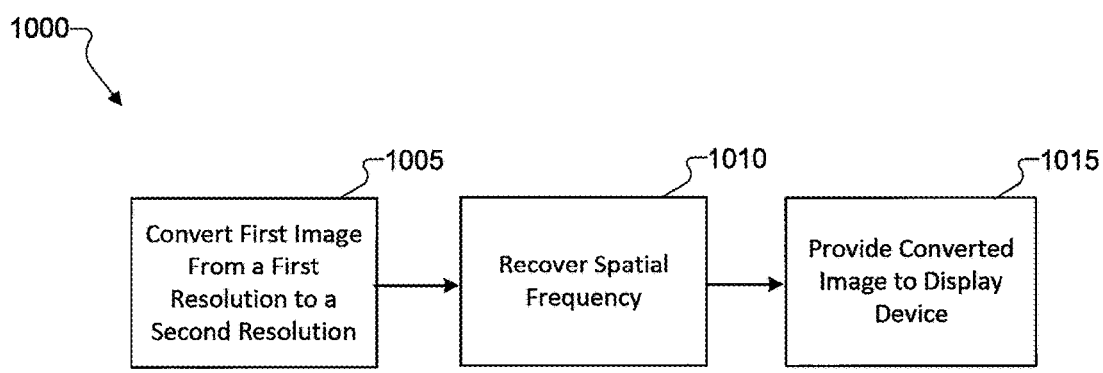
FIG. 10 illustrates a flow chart of a method for converting image content according to an embodiment of the present disclosure

FIG. 10 illustrates a flow chart of a process for converting image content according to an embodiment of the present disclosure. While the process 1000 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1000 depicted in the example depicted is implemented by a processing circuitry in, for example, a display driving device. Examples of display driving devices include the client devices 106-116 of FIG. 1 and any suitable electronic device(s) implementing the system 700 of FIG. 7.

A display driving device, such as a television, video player, or the like, is configured to convert image content of a first resolution for display on a device having a display resolution that is greater than the first resolution. The content may be converted and displayed at the display resolution or a second resolution that is greater than the first resolution but less than the display resolution. For example, in block 1005 a first image is converted from a first resolution to a second resolution that is greater than the first resolution. An example method for performing block 1005 is described in greater detail above in connection with block 705 of FIG. 7. In block 1010, the display driving device recovers spatial frequency of the converted first image, namely the initial guess resulting from image interpolation 705, as a function of a relative edge growth rate measured from the converted first image and an offline-determined relationship between the relative edge growth rates of the converted first image and an associated reference value. An example method for performing block 1010 is described in greater detail above in connection with blocks 710, 715, 720, 725 of FIG. 7. In block 1015, the converted first image with the recovered spatial frequency is provided for display on a display device. For example, a processor or display device interface provides the converted first image to a frame buffer of a display device or transmits the converted first image to a display.

In certain embodiments, the system 700 is configured to determine whether to perform the method 1000. The determination can be based on a number of considerations. For example, the system 700 can selectively perform the method 1000 based on comparing the resolution of the input video content and the display resolution. For example, in response to a request to render input video content, the system 700 determines the resolution of the input video content by accessing metadata associated with the video content or based on the resolution of a frame of the input video content. The system 700 can determine the display resolution based on metadata stored in firmware, such as stored in storage 215, or, in some example embodiment, based on the dimensions of the graphical user interface window that is to render the video content. In response to a determination that the video content is less than the resolution of the display resolution, the system 700 determines the factor for up-conversion, such as a function of the ratio of the video content resolution and the display resolution, and performs the method 1000 using the determined factor.

In certain embodiments, the system 700 determines to perform the method 1000 based on other considerations. Example considerations can include: the system 700 having the power capacity of performing the method 1000, such as not operating in a low-power state; the system 700 having the computational bandwidth for performing the method 1000; the system 700 having the communication bandwidth to transmit the upscaled video content; and any suitable condition. The condition of the power capacity can be based on the power cost of performing the method 1000, such as determined as a function of on data stored in the storage 215, and the duration of the input video content.

In certain embodiments, the system 700 determines to perform the method 1000 in response to events other than the receiving of a request to render input video content. For example, the system 700, while rendering input video content with or without performing the method 1000, can perform the determination in response to a resizing of the GUI window for rendering the video content or dynamic changes in display devices, such as a user causing the system to stream video content to a second device. In such an embodiment, the system can apply the method 1000 dynamically in response to changing viewing conditions.

None of the description in this application should be read as implying that any particular element, step, or function is an essential element that must be included in the claim scope. The scope of patented subject matter is defined only by the claims. Moreover, To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
   an interface configured to receive image content comprising a first resolution;
   a display device configured to display image content at a second resolution, the second resolution greater than the first resolution; and
   one or more processors configured to:
      convert the image content from the first resolution to the second resolution;
      recover a spatial frequency of the converted image content as a function of a relative edge growth rate measured from the converted image content and an offline-determined relationship between the relative edge growth rates of the converted first image and an associated reference value; and
      provide the converted image content with the recovered spatial frequency to the display device,
      wherein recovering the spatial frequency of the converted image content comprises:
         determining the relative edge growth rate of an edge transition unit associated with an edge in the converted first image, and
         adjusting the relative edge growth rate as a function of an offline-determined adjustment factor, the offline-determined adjustment factor corresponding to a determined significance value of the edge.

2. The apparatus according to claim 1, wherein the one or more processors is configured to recover of the spatial frequency by:
   adjusting the edge transition unit associated with the edge in the converted first image based on the adjusted relative edge growth rate to perform image edge sharpening.

3. The apparatus according to claim 2, wherein the one or more processors is configured to adjust the relative edge growth rate by:
   computing the offline-determined adjustment factor based on a gradient of the converted first image in accordance with the offline-determined relationship; and
   determining the adjusted relative edge growth rate based on scaling a computed spatial growth rate by the offline-determined adjustment factor.

4. The apparatus according to claim 1, wherein the one or more processors are configured to execute a plurality of instructions for a prior-probability-based image super-resolution (SR) up-sampling for image enhancement that is deployed by an ultra-high definition display to convert standard or full high-definition video to ultra-high definition video in real-time.

5. The apparatus according to claim 1, wherein the second resolution comprises an ultra-high definition comprising a display format having a 16×9 ratio with at least one digital input cable carrying a minimum resolution of 3,840×2,160 pixels.

6. The apparatus according to claim 1, further comprising the display device and wherein the one or more processors are configured to control the display device to display the converted image.

7. The apparatus according to claim 6, wherein the display device comprises an ultra-high definition display for one of: a television display or computer display.

8. A method for converting image content, the method comprising:
   converting, by a processor in an electronic device, a first image from a first resolution to a second resolution that is greater than the first resolution;
   recovering, by the processor, spatial frequency of the converted first image as a function of a relative edge growth rate measured from the converted first image and an offline-determined relationship between the relative edge growth rates of the converted first image and an associated reference value; and
   providing the converted first image with the recovered spatial frequency for display on a display device,
   wherein recovering spatial frequency of the converted first image comprises:
      determining the relative edge growth rate of an edge transition unit associated with an edge in the converted first image, and
      adjusting the relative edge growth rate as a function of an offline-determined adjustment factor, the offline-determined adjustment factor corresponding to a determined significance value of the edge.

9. The method according to claim 8, wherein recovering the spatial frequency further comprises:
   adjusting the edge transition unit associated with the edge in the converted first image based on the adjusted relative edge growth rate to perform image edge sharpening.

10. The method according to claim 9, wherein adjusting the relative edge growth rate comprises:
   computing the offline-determined adjustment factor based on a gradient of the converted first image in accordance with the offline-determined relationship; and
   determining the adjusted relative edge growth rate based on scaling a computed spatial growth rate by the offline-determined adjustment factor.

11. The method according to claim 8, wherein converting a first image from the first resolution to the second resolution comprises employing a prior-probability-based image super-resolution (SR) up-sampling for image enhancement that is deployed by an ultra-high definition display to convert standard or full high-definition video to ultra-high definition video in real-time.

12. The method according to claim 8, wherein the second resolution comprises an ultra-high definition comprising a display format having a 16:9 ratio with at least one digital input cable carrying a minimum resolution of 3,840×2,160 pixels.

13. The method according to claim 8, further comprising displaying, on the display device, the converted image.

14. A non-transitory computer readable medium embodying a computer program, the computer program comprising computer readable program code that, when executed by a processor, causes the processor to:
   convert a first image from a first resolution to a second resolution, the second resolution is greater than the first resolution;
   recover a spatial frequency of the converted first image as a function of a relative edge growth rate measured from the converted first image and an offline-determined relationship between the relative edge growth rates of the converted first image and an associated reference value; and
   provide the converted first image with the recovered spatial frequency for display on a display device,
      wherein recovering the spatial frequency of the converted first image comprises:
         determining the relative edge growth rate of an edge transition unit associated with an edge in the converted first image, and
         adjusting the relative edge growth rate as a function of an offline-determined adjustment factor, the offline-determined adjustment factor corresponding to a determined significance value of the edge.

15. The non-transitory computer readable medium according to claim 14, wherein recovering the spatial frequency further comprises:
   adjusting the edge transition unit associated with the edge in the converted first image based on the adjusted relative edge growth rate to perform image edge sharpening.

16. The non-transitory computer readable medium according to claim 15, wherein adjusting the relative edge growth rate comprises:
   computing the offline-determined adjustment factor based on a gradient of the converted first image in accordance with the offline-determined relationship; and
   determining the adjusted relative edge growth rate based on scaling a computed spatial growth rate by the offline-determined adjustment factor.

17. The non-transitory computer readable medium according to claim 14, wherein the computer program comprises a plurality of instructions for a prior-probability-based image super-resolution (SR) up-sampling for image enhancement that is deployed by an ultra-high definition display to convert standard or full high-definition video to ultra-high definition video in real-time.

18. The non-transitory computer readable medium according to claim 14, wherein the second resolution comprises an ultra-high definition comprising a display format having a 16:9 ratio with at least one digital input cable carrying a minimum resolution of 3,840×2,160 pixels.

19. The non-transitory computer readable medium according to claim 14, further comprising a plurality of instructions that, when executed by a processor, cause the processor control the display device to: display the converted image.

20. The non-transitory computer readable medium according to claim 14, wherein the display device comprises an ultra-high definition display for one of: a television or computer display.

* * * * *